United States Patent
Ito

(12) 
(10) Patent No.: US 6,731,754 B1
(45) Date of Patent: May 4, 2004

(54) APPARATUS AND METHOD FOR MAINTAINING AND TRANSMITTING SECRET CONTENTS OF A SIGNAL

(75) Inventor: Toru Ito, Yokohama (JP)

(73) Assignee: Netcomsec Co., Ltd., Tokyo (JP)

( * ) Notice: Subject to any disclaimer, the term of this patent is extended or adjusted under 35 U.S.C. 154(b) by 0 days.

(21) Appl. No.: 09/384,540

(22) Filed: Aug. 27, 1999

Related U.S. Application Data

(63) Continuation-in-part of application No. 08/879,041, filed on Jun. 19, 1997.

(30) Foreign Application Priority Data

Jun. 21, 1996 (JP) ............................................. 8/162152

(51) Int. Cl.[7] .............................. H04K 1/00; H04L 9/00
(52) U.S. Cl. .............................. 380/28; 380/59; 380/37
(58) Field of Search ............................. 380/28, 29, 59, 380/30, 37

(56) References Cited

U.S. PATENT DOCUMENTS

| | | | |
|---|---|---|---|
| 4,376,279 A | | 3/1983 | Perlman et al. |
| 4,501,957 A | * | 2/1985 | Perlman et al. ............. 235/379 |
| 4,675,477 A | | 6/1987 | Thornwall |
| 4,731,843 A | * | 3/1988 | Holmquist ................... 380/29 |
| 4,815,130 A | | 3/1989 | Lee et al. |
| 5,724,427 A | | 3/1998 | Reeds, III |
| 5,727,062 A | | 3/1998 | Ritter |
| 5,838,794 A | | 11/1998 | Mittenthal |

OTHER PUBLICATIONS

Bruce Schneier, "Applied Cryptology: Protocols, Algorithms, and Cource Code in C", 1st ed., pp. 154–165, "Block Cipher Modes", John Wiley and sons, NY (1993).

Bruce Schneier, "Applied Cryptology: Protocols, Algorithms, and Source Code in C", 2nd Ed., pp. 189–211 "Algorithm Types and Modes", John Wiley and Sons, NY (Oct. 1995).

* cited by examiner

*Primary Examiner*—Gilberto Barrón
*Assistant Examiner*—Benjamin E. Lanier
(74) *Attorney, Agent, or Firm*—Oliff & Berridge, PLC

(57) ABSTRACT

The secrecy security of coded data can be improved markedly by making it possible to freely vary, within a plurality of natural numbers, the values as the result of coding and decoding operations by a converter using a feedback coding method. As a digital information secrecy security system, the proposed coding method employs a feedback coding method, wherein a Latin square composed of a plurality of natural numbers is used for operation in a converter component of coder and decoder. An initial value IV is set for each of coder and decoder. A preceding coded signal is used as a feedback signal and a feedforward signal for enabling natural numbers to be used as the result of coding, thereby markedly improving the secrecy security of coded signal.

14 Claims, 10 Drawing Sheets

FIG. 2(a)

| 1 | 0 | 3 | 2 |
|---|---|---|---|
| 3 | 1 | 2 | 0 |
| 0 | 2 | 1 | 3 |
| 2 | 3 | 0 | 1 |

FIG. 2(b)

| 2 | 0 | 3 | 1 |
|---|---|---|---|
| 0 | 1 | 2 | 3 |
| 3 | 2 | 1 | 0 |
| 1 | 3 | 0 | 2 |

FIG. 2(c)

| 1 | 0 | 3 | 2 |
|---|---|---|---|
| 3 | 1 | 2 | 0 |
| 0 | 2 | 1 | 3 |
| 2 | 3 | 0 | 1 |

APPARATUS AND METHOD FOR MAINTAINING AND TRANSMITTING SECRET CONTENTS OF A SIGNAL

This is a Continuation-in-Part of Application Ser. No. 08/879,041 filed Jun. 19, 1997. The entire disclosure of the prior application(s) is hereby incorporated by reference herein in its entirety.

BACKGROUND OF THE INVENTION

This continuation-in-part application claims the benefit of U.S. Application Ser. No. 08/879,041 filed on Jun. 19, 1998, for the subject matter that both contained in this application and 09/879,041.

1. Field of Invention

This invention relates to a coding method, including a decoding method, for transmitting and storing the content of plain-text in the form of digital information while securing the secrecy thereof. More particularly, the invention relates to a chain coding method, wherein a Latin square, which is a conversion table, is used as a cipher key for coding and decoding, and a plain-text signal, which is used as a data to be input, consisting of a predetermined number of bits (even 1 bit will do), is used as a unit block for feedback and feedforward decoding.

2. Description of Related Art

There have been various proposed coding methods used as the means for securing secrecy of data. The typical examples of such methods are DES (Data Encryption Standard) of the United States and FEAL-8 developed by NTT (Nippon Telegraph and Telephone Corporation).

These methods use a kind of block cipher that codes or decodes input data by block unit under the control of a secret coding key and obtains secrecy-secured code (cipher) by repeating conversion.

However, such methods have a shortcoming that, as long as the same key is used, the same coding block (hereinafter referred to simply as a coded signal) is obtained from the same plain-text block (hereinafter referred to as a plain-text signal).

Such a shortcoming does not immediately allow easy analysis of code; however, when many of the same coded signals are used for coding a large amount of input data, this shortcoming may suggest some hint how to analyze such code.

For overcoming such a shortcoming, a feedback coding method as shown in FIG. 10 has been adopted. In this feedback coding method, in the coding stage A, in generating a coded signal $C_i$ from a plain-text signal $P_i$ (block No. i=1, 2, . . . ) using a key, a preceding coded signal $C_{i-1}$ is used as a feedback signal $C_b$. This feedback signal $C_b$ and the plain-text signal $P_i$ are combined to form the coded signal $C_i$. In the decoding stage B, a plain-text signal $P_i$ is produced from the coded signal $C_i$ using the same key, a preceding coded signal $C_{i-1}$ is used as a feedforward signal $C_1$ and this feedforward signal $C_f$ and coded signal $C_i$ are combined to produce the plain-text signal $P_i$ by decoding.

IV is an initial value signal used for coding and decoding initial plain-text signal $P_i$ and decoding the coded signal $C_i$. For IV, a predetermined value is used (the value of the initial value signal IV should be assigned in advance for both the coding stage A side and decoding stage B side or assigned together with plain-text signal $P_i$).

Given below are the numerical expressions of the above processes.

| Coding Stage A Side: | |
|---|---|
| 1st block (i = 1) | $V_i = g(IV)$ |
|  | $C_i = \text{xor}(P_i, f_k(V_i))$ |
| 2nd and subsequent blocks (i = 2,...) | $V_i = g(C_{i-1})$ |
|  | $C_i = \text{xor}(P_i, f_k(V_i))$ |
| Decoding Stage B Side: | |
| 1st block (i = 1) | $V_i = g(IV)$ |
|  | $P_i = \text{xor}(C_i, f_k(V_i))$ |
| 2nd and subsequent blocks (i = 2,...) | $V_i = g(C_{i-1})$ |
|  | $P_i = \text{xor}(C_i, f_k(V_i))$ |

In the above numerical expressions, a coding function f represents a predetermined coding algorithm such as DES and FEAL-8, and function g represents a specific discrete function defined for all the coded signals $C_i$. For example, when the simplest identity function is chosen, $V_i = C_{i-1}$, the operation "xor", performed by arithmetic unit 5, combines a plain-text signal $P_i$ and a feedback signal $C_b$ for the purpose of coding or combines coding signal $C_i$ and feedforward signal $C_f$ for the purpose of decoding. This "xor" operation is the operation for "exclusive or" (addition by modulo 2) and is also a mathematically reversible operation.

Further simplifying the above numerical expressions, we obtain

| Coding Stage A Side: | |
|---|---|
| 1st block (i = 1) | $C_i = \text{xor}(P_i, IV)$ |
| 2nd and subsequent blocks (i = 2,...) | $C_i = \text{xor}(P_i, C_{i-1})$ |
| Decoding Stage B Side: | |
| 1st block (i = 1) | $P_i = \text{xor}(C_i, IV)$ |
| 2nd and subsequent blocks (i = 2,...) | $P_i = \text{xor}(C_i, C_{i-1})$ |

To code the 1st data block, the "xor" operation is performed on the plain-text signal $P_i$ (binary number of 1 digit) and the initial value signal IV (binary number of 1 digit) to obtain coded signal $C_i$. To code the 2nd and subsequent data blocks, the "xor" operation is performed on the plain-text signal $P_i$ and the preceding coded signal $C_{i-1}$ (binary number of 1 digit), which is the feedback signal $C_b$, to obtain coded signal $C_i$.

Further, to decode the 1st data block, the "xor" operation is performed on the coded signal $C_1$ with the initial value signal IV given as a feedforward value, to obtain decoded plain-text signal $P_i$.

For decoding the 2nd and subsequent data blocks, the "xor" operation is performed on the coded signal $C_1$ with the preceding signal $C_{i-1}$ given as a feedforward signal $C_f$ to obtain decoded plain-text signal $P_1$.

As described above, according to the prior art, the "xor" operation always ends in a fixed value, that is, when the "exclusive or" (addition by modulo 2) operation is applied to the plain-text signal $P_i$ and the input value of preceding coded signal $C_{1-1}$ or applied to the input values of the coded signal $C_i$ and preceding signal $C_{i-1}$.

However, according to the prior art described above, when the "xor" operation, that is, the "exclusive or" operation (addition by modulo 2) for coding/decoding by feedback coding method is performed, the result of the operation for the input value and the feedback value always ends in fixed values due to the addition by modulo 2. In other words, for the input value data blocks (binary number of 1 digit), feedback value data blocks and output value data blocks, the output value is 0 when both the input value and the feedback value is 0 or 1, while the output value is 1 when the input value and the feedback value are 0 and 1, or 1 and 0. Therefore, the result of the output is fixed for each bit, thereby causing a problem that such a system may provide some hint for data decoding.

Thus, this invention is devised to solve such a problem of the prior art by accomplishing a technical task, that is, to freely vary the values resulting from the "xor" operation for coding/decoding by the feedback coding method or to freely vary the values resulting from the "exclusive or" operation (addition by modulo 2), thereby making it extremely difficult to decode the coded input data.

SUMMARY OF THE INVENTION

In the following explanation, natural numbers are used as the elements of the matrix of a Latin square, but the Latin alphabet may also be used.

To accomplish the aforesaid technical task, an illustrative embodiment of the invention includes a coding method and a feedback coding method. The coding method provides a secrecy security system designed for transmitting and storing the content of plain-text converted into digital information while securing the secrecy of the content thereof. The feedback coding method codes using a plain-text signal having a predetermined number of bits as a unit block. An illustrative embodiment of the invention also uses a coding Latin square as a conversion table for a converter in conversion stage of the feedback coding method, uses the plain-text signal and the initial value signal for the initial conversion, and uses a plain-text signal and coded signal converted from a preceding plain-text signal as a feedback signal to specify positions of the rows and columns of the coding Latin square and to use the value of the specified position as coded signal. A feedforward decoding method for decoding by unit block of coded signal may be used. Additionally, a decoding Latin square is used as a conversion table, when the decoding Latin square corresponds to the coding Latin square for the converter in the decoding stage of the feedforward decoding method. An illustrative embodiment of the invention also uses a coded signal and the same initial value signal as is used for coding in the first conversion, and uses as feedforward signal, a coded signal and preceding coded signal for the second and subsequent conversions to use, as a decoded plain-text signal, the value obtained from decoding Latin square.

Additionally, an illustrative embodiment of the invention can include a means, whereby a converter component of decoder is formed with a decoding Latin square for performing inverse conversion to the conversion by coding Latin square, and the decoded plain-text signal is formed according to a value of the decoding Latin square determined by the value of the row or column represented by a coded signal and the value of the row or column represented by a feedforward signal, which is an initial value signal or preceding coded signal.

Also, an illustrative embodiment of the invention can include a means, whereby the converter component of the decoder is formed with the decoding Latin square corresponding to the coding Latin square, and a decoded plain-text signal is formed according to the value of the row or column represented by the coded signal and the value of the row and column of the decoding Latin square determined from the value of the initial value signal or the value of decoding Latin square represented by a feedforward signal, which is preceding coded signal.

An illustrative embodiment of the invention can include an additional means, whereby the initial value signal and the preceding coded signal input to the converter are coded by a coding function, which is a predetermined coding algorithm, and input to the coding Latin square and the decoding Latin square.

An illustrative embodiment of the invention can include another additional means, whereby, in the converter of the coding stage, the output from the coding Latin square is converted into a coded signal by a coding function, which is a predetermined coding algorithm, and in the converter of decoding stage, the input coded signal is decoded by a decoding function for conversion, which inverses the conversion performed by the coding function and input to the decoding Latin square.

An illustrative embodiment of the invention can include a means, whereby the coding Latin square and decoding Latin square respectively comprise a plurality of Latin squares, and a plurality of Latin squares are used selectively according to a predetermined sequence by being synchronized with input of the plain-text signal or input of the coded signal.

Additionally, an illustrative embodiment of the invention can include a means, whereby a plurality of coders and a plurality of decoders are connected in series respectively.

An illustrative embodiment of the invention can include a means, whereby a plurality of coders and a plurality of decoders are connected in parallel respectively; a plurality of plain-text signals are distributed according to a predetermined arrangement to be input substantially simultaneously to each of the coders, and individual plain-text signals are output substantially simultaneously from the decoders respectively and are arranged according to a predetermined sequence to be output.

An illustrative embodiment of the invention can include another additional means in the coder, whereby a preceding coded signal that precedes a given output signal is used as a feedback signal. Additionally, the illustrative embodiment can include another additional means in the decoder, whereby a preceding coded signal to a given input signal is used as feedforward signal.

An illustrative embodiment of the invention can include another additional means, whereby a preceding coded signal received from another coder is used as a feedback signal, and a preceding coded signal sent to another decoder is used as a feedforward signal.

An illustrative embodiment of the invention may also include a means, whereby a plurality of series circuits composed of a plurality of coders and a plurality of decoders, which are connected in series are provided, and a plurality of input plain-text signals are distributed among a plurality of series circuits of coders substantially simultaneously, according to a predetermined sequence, and a plurality of plain-text signals are substantially simultaneously output from the plurality of series circuits of decoders arranged according to a predetermined sequence to be output.

An illustrative embodiment of the invention can include another additional means, whereby, in each of coders connected in series, a preceding coded signal that precedes a given output signal is used as a feedback signal, and, in each of decoders connected in series, a preceding coded signal that precedes a given input coded signal is used as a feedforward signal.

An illustrative embodiment of the invention can include another additional means, whereby, in each of coders connected in series, a preceding coded signal received from a corresponding coder of the series circuit composed of other coders is used as a feedback signal, and, in decoders connected in series, a preceding coded signal received from a corresponding decoder in the series circuit of other decoders is used as a feedforward signal.

An illustrative embodiment of the invention can include a means, whereby the input of the initial value signal to the converter is made using the previously provided input line for the feedback signal or the feedforward signal of the initial value signal.

An illustrative embodiment of the invention can include a means, whereby the input of the initial value code to converter is made accompanying the initial plain-text signal or the initial coded signal.

The invention described in claim 1 can be expressed as follows
(Refer to FIG. 1):

For coding: $C_i = L_M(P_i, C_{i-1})$
For decoding: $P_i = L_M^{-1}(C_i, C_{i-1})$
where: $P_i$ = Plain-text signal (Signal No. i=1, 2, ...);
$C_i$ = Coded signal (Signal No. i=0, 1, 2, ...);

Note, however, that, for $C_0$=IV, the value previously used as an initial value is used; L is a Latin square used for conversion; and M is a number of a conversion table for selecting one conversion table as a key from among a plurality of Latin squares.

The value of the plain-text signal $P_i$ and the value of the preceding coded signal $C_{i-1}$ are the values (pointers) respectively representing the positions of the rows and columns of the coding Latin square $L_M$, while the coded signal $C_i$ is the value of the element of the decoding Latin square $L_M^{-1}$ represented by the row pointer and column pointer. Where the decoding Latin square $L_M^{-1}$ is considered to be a Latin square of an inverse function as to the row or column of coding Latin square $L_M$, when the coded signal $C_i$ is treated as a row pointer, the coding Latin square $L_M$ is an inverse function with respect to the row. Also, where decoding Latin square $L_M^{-1}$ is the same Latin square used as the coding Latin square $L_M$, the former is a Latin square of inverse function for determining the pointer value of the row or column from the value of the element of the coding Latin square $L_M$.

When the plain-text signal $P_i$ and the preceding coded signal $C_{i-1}$ are input to the coding Latin square $L_M$, the coded signal $C_i$ is obtained as an output. When the coded signal $C_1$ and the preceding coded signal $C_i$ are input to the decoding Latin square $L_M^{-1}$ of inverse function, a plain text signal $P_i$ is obtained. Coding can be expressed as a value of the conversion table $C_i = L_M$ (the value of row pointer=$P_1$, value of column pointer=$C_{i-1}$).

For decoding according to one illustrative embodiment of the invention, the value of the conversion table can be expressed as $P_i = L_M^{-1}$ (value of row pointer=$C_i$, value of column pointer=$C_{i-1}$).

According another illustrative embodiment of the invention, the value of the row pointer can be expressed as value of row pointer $P_i = L_M^{-1}$ (value of conversion table=$C_i$, value of column pointer=$C_{i-1}$).

The Latin square is composed of $n^2$ number in total of numeric values arranged in a rectangular form consisting of n number of rows and n number of columns. Each of the numeric values is taken n number of times from a set of n number of numeric values (0 through n-1) so that each of the n number of numeric values occurs once in each row and each column. Therefore, when the number of numeric values of irreducible form (standard form), which is a permutation of given reference, is given as $L_n$ for both the first row and first column, and when n=1 through 9, the numbers of standard form are sequentially 1, 1, 1, 4, 56, 9408, 16942080, 535281401856, 377597570964258816 (total number of n-th degree is n !·(n−1)!·(Ln), which is the available number of Latin squares for each order of number (refer to p. 1250, Mathematics Dictionary, 3rd Edition, Iwanami Shoten).

An example of degree n=4, that is, a 4th-degree Latin square of 4 rows and 4 columns and an example of a Latin square for inverse conversion of the 4th-degree Latin square are shown in FIG. 2(a) and FIG. 2(b), respectively. Here, the Latin square of FIG. 2(a) and the Latin square of FIG. 2(b) are illustrated as matrix I and matrix II, respectively.

TABLE 1

$$I = \begin{bmatrix} a11 & a12 & a13 & a14 \\ a21 & a22 & a23 & a24 \\ a31 & a32 & a33 & a34 \\ a41 & a42 & a43 & a44 \end{bmatrix} = \begin{bmatrix} 1 & 0 & 3 & 2 \\ 3 & 1 & 2 & 0 \\ 0 & 2 & 1 & 3 \\ 2 & 3 & 0 & 1 \end{bmatrix}$$

$$II = \begin{bmatrix} b11 & b12 & b13 & b14 \\ b21 & b22 & b23 & b24 \\ b31 & b32 & b33 & b34 \\ b41 & b42 & b43 & b44 \end{bmatrix} = \begin{bmatrix} 2 & 0 & 3 & 1 \\ 0 & 1 & 2 & 3 \\ 3 & 2 & 1 & 0 \\ 1 & 3 & 0 & 2 \end{bmatrix}$$

$a_{ij}$ (i=1 to 4; j=1 through 4) and $b_{ij}$ (i=1 to 4; j=1 through 4) are elements of the matrices I and II respectively. i and j represent the positions of row and column respectively.

Using the Latin square for conversion into code, the conversion can be made non-linearly by performing conversion by a unit consisting of a plurality of bits. The conversion can be performed accurately and easily, since one of the value of row, value of column and value of element are determined when any two of these values are determined.

The Latin square conversion can involve conversion by a known coding function and decoding function thereby adding to the complexity and resulting difficulty of analysis.

Optionally, the preceding and subsequent coded signals can be coded based on entirely different Latin squares, so that it is substantially impossible to identify the Latin square as the key to coding from among coded signals.

Additionally, the sequence of transmission of the coded signals is not necessarily in accordance with the sequence of the contents of the coded signals, thereby making it impossible to analyze the coded signal with reference to the relationship between preceding signals and subsequent signals.

The coding can also be performed as multiplex coding thereby making it difficult to analyze coded signal.

Although coding can be performed very simply as a whole, it is also possible to provide a means for adding to the complexity of the interrelation among individual coded signals.

An initial value signal can be set and input using a dedicated circuit protected from monitoring, so that a high secrecy-security ability for initial value signal can be assured.

Additionally, in various embodiments of the present invention secrecy-security ability may be provided without the use of a dedicated circuit for input of an initial value signal and the initial value signal setting operation on the side of decoding stage.

BRIEF DESCRIPTION OF THE DRAWINGS

Various embodiments of this invention will be described in detail, with reference to the following figures, wherein:

FIGS. 2(a), 2(b) and 2(c) show examples of Latin square used for the invention;

DETAILED DESCRIPTION OF PREFERRED EMBODIMENTS

Figure 1A:
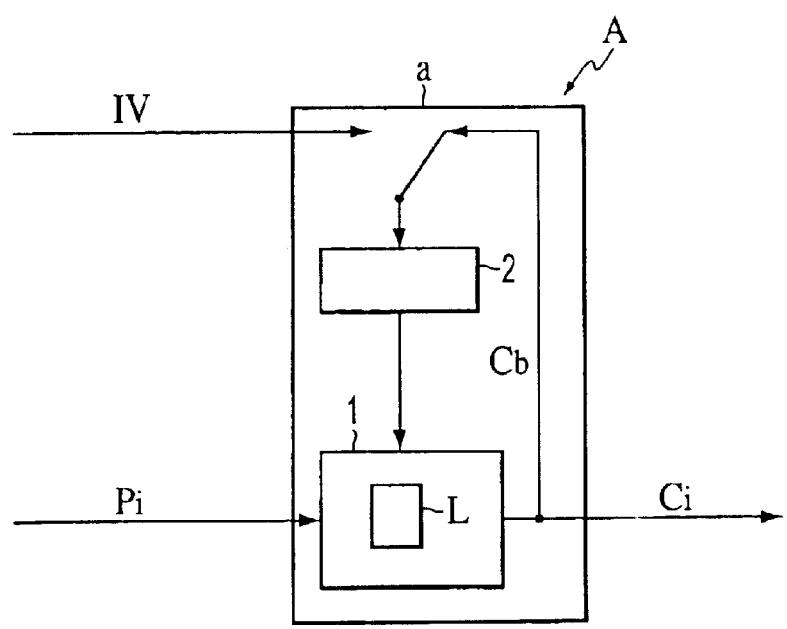
FIGS. 1(a) and 1(b) show constitution of the most basic embodiment of the invention.

The embodiments of the invention will be described in the following, referring to FIG. 1 through FIG. 9.

In the following description, for convenience, the description will be made as to the embodiment wherein 4th-degree Latin square is used. The 4th-degree Latin square is available in 576 variations in total, and thus the keys are available in 576 variations in total number. In the case of the 4th-degree Latin square, the matrix thereof is arranged in 4 rows and 4 columns, the values of the pointers of the rows and column s are 0 through 3. For plaintext signals $P_i$ to be input, predetermined initial value signal IV, feedback signal $C_b$, feedforward signal $C_f$ and coded signal $C_i$, 1 block consists of 2 bits.

On the contrary, when the number of bits of the data block to be converted is made to be 1 bit, the degree of the Latin square becomes a 2nd degree, a 4th degree when using 2 bit data blocks, an 8th degree when using 3 bit data blocks and a 16th degree when using 4 bit data blocks, since the degree is determined by raising 2 to the power of the number of bits. However, when the 4th degree is used, input data is divided into 2 bits for coding.

Figure 1B:
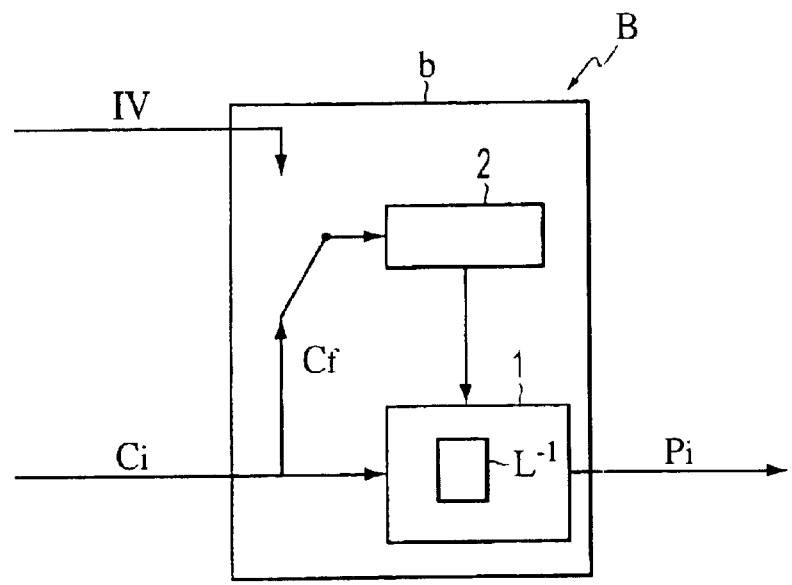

FIGS. 1(a) and 1(b) show an embodiment representing the most basic constitution of the invention. FIG. 1(a) is a coding stage A and FIG. 1(b) is a decoding stage B. The coding stage A comprises a temporary storage 2 for temporarily storing and outputting the initial value signal IV and the feedback signal $C_b$ and a coding converter component 1 provided with a coding Latin square L. The decoding stage B comprises a temporary storage 2 for temporarily storing and outputting the initial value signal IV and the feedforward signal $C_i$ and a decoder converter component 1 provided with a decoding Latin square $L^{-1}$. Examples of coding and decoding according to the embodiment shown in FIGS. 1(a) and 1(b) will be described referring to the Latin square shown in FIG. 2 (a) as a coding Latin square L and also referring to the Latin square shown in FIG. 2(b) as a decoding Latin square $L^{-1}$.

When plain-text to be converted (quadric numbers 3120 divided by 2 bits (four plain-text signals $P_i$ for $P_1$=3, $P_2$=1, $P_3$=2, $P_4$=0) and an initial value signal IV (column position pointer=$C_0$=3)) are made available and coded sequentially. Since the initial value signal IV (column position pointer= $C_0$) is 3, and the plaintext signals $P_i$ (row position pointer) to be input is 3, an element $a_{44}$=1, which is the element of the 4th row and the 4th column of the coding Latin square L, is selected to get coded signal $C_1$ having a value 1 and coded signal $C_1$ becomes the feedback signal $C_b$.

Since the next plain-text signal $P_2$ (row position pointer) is 1, and the feedback signal $C_b$ is 1, element $a_{22}$=1, the element of the 2nd row and the 2nd column of the coding Latin square L, is selected to get coded signal $C_2$ having a value 1. Further, since plain-text signal $P_3$ is 2, and feedback signal $C_b$ is 1, element $a_{32}$ of the Latin square L is selected to make 2 of the coded signal $C_3$. Finally, since plain-text signal $P_4$ is 0, and feedback signal $C_b$ is 2, an element $a_{13}$ of coding Latin square L is selected, and the coded signal $C_4$ becomes 3. That is, the cipher-text becomes 1123.

Next, when the coded signals $C_1$=1, $C_2$=1, $C_3$=2, $C_4$=3 are decoded, since the initial value signal IV (column position pointer=$C_0$) is 3, and the coded signal $C_1$ (row position pointer) to be input is 1, an element $b_{24}$=3, which is the element of 2nd row and 4th column of the decoding Latin square $L^{-1}$, is selected, the decoded plain-text signal $P_1$ becomes 3 and coded signal $C_f$=1becomes the feedforward signal $C_i$.

Since the next coded signal $C_2$ is 1, and feedforward signal $C_f$ (column position pointer) is 1, an element $b_{22}$=1, which is the element of the 2nd row and 2nd column of the decoding Latin square $L^{-1}$, is selected to make 1 of the coded plain-text signal $P_2$. Since the coded signal $C_3$ is 2, and the feedforward signal $C_f$ is 1, an element $b_{32}$, the element of the 3rd row and the 2nd column of the decoding Latin square $L_{-1}$is selected to make 2 of the decoded plain-text signal $P_3$. Finally, since coded signal $C_4$ is 3, and feedforward signal $C_f$ is 2, an element $b_{43}$=0, the element of the 4th row and 3rd column of the decoding Latin square $L^{-1}$, is selected to make 0 of the decoded plain-text signal $P_4$, thereby restoring original plain-text (3120)($P_1$=3, $P_2$=1, $P_3$=2, $P_4$=0).

A decoding process for a cipher-text (1123) coded using the decoding Latin square $L^{-1}$ shown in FIG. 2(c), corresponding to the coding Latin square L, is explained in the following.

When coded signals $C_1$=1, $C_2$=1, $C_3$=2, $C_4$=3 are decoded, initial signal IV (column position pointer=$C_0$) is 3, and the coded signal $C_1$ representing the value of the element of the decoding Latin square $L^{-1}$ is 1. Therefore, the pointer of the row position of the decoding Latin square $L^{-1}$ is selected to make the decoded plain-text signal P=3, and the coded signal $C_1$=1 becomes feedforward signal $C_f$.

Since the next coded signal $C_2$ is 1, and feedforward signal $C_f$ (column position pointer) is 1, the row position pointer of the decoding Latin square $L^{-1}$ is selected to make the decoded plain-text signal $P_2$=1. Further, since the coded signal $C_3$ is 2, and the feedforward signal $C_f$=1, the row position pointer of the decoding Latin square $L^{-1}$ is selected to make the decoded plain-text signal $P_3$=2. Finally, since the coded signal $C_4$ is 3, and the feedforward signal $C_f$ is 2, the row position pointer of the decoding Latin square $L^{-1}$ is selected to make decoded plain-text signal $P_4=0$, and the original plain-text (3120) ($P_1=3$, $P_2=1$, $P_3=2$, $P_4=0$) is restored.

Figure 3A:
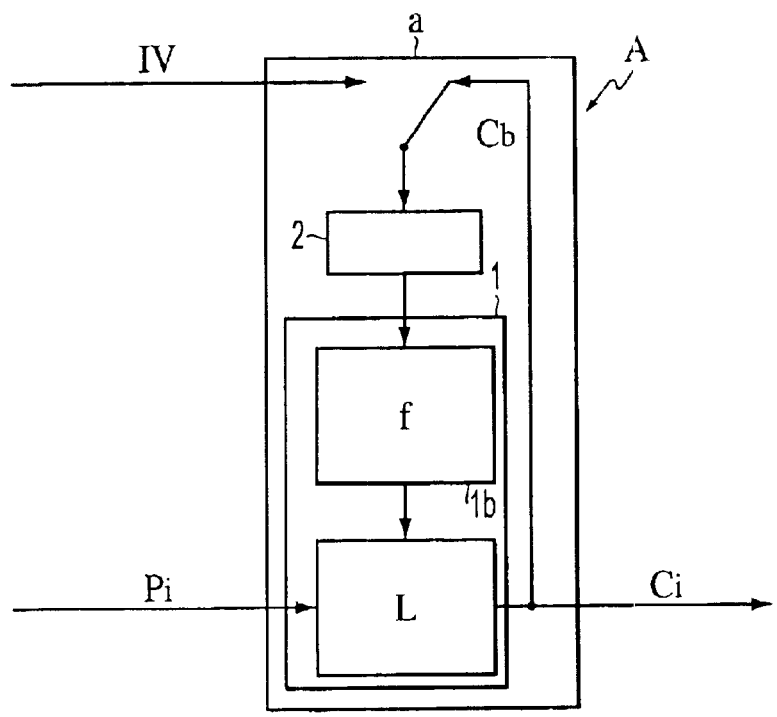
FIGS. 3(a) and 3(b) show constitution of an embodiment of the invention to which coding function for ciphering is added.
Figure 3B:
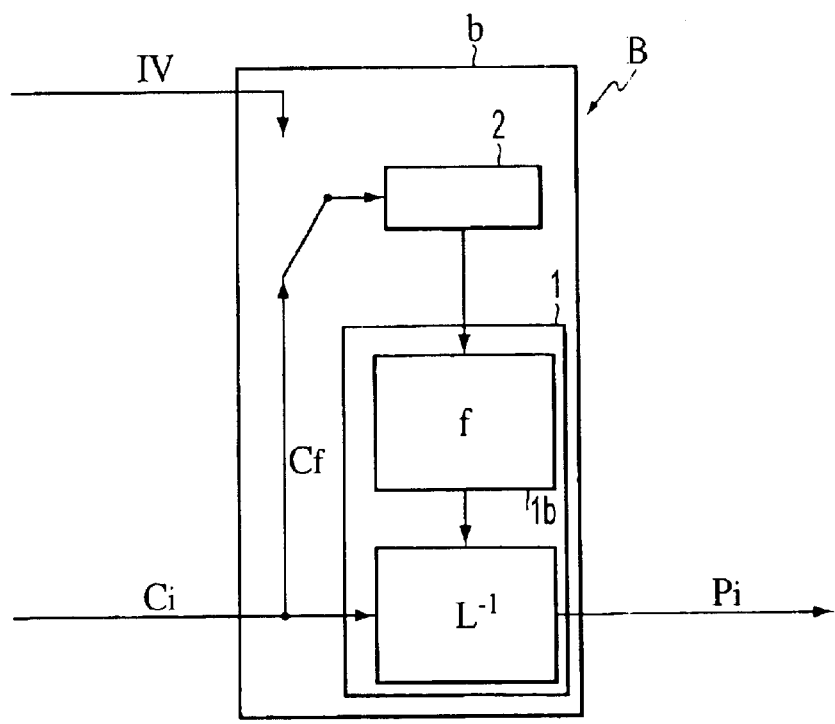

FIGS. 3(a) and 3(b) show an embodiment for coding the initial value signal IV and the preceding coded signal $C_{i-1}$ using coding function f, a predetermined coding algorithm, and inputting the coded values to Latin square. FIG. 3(a) illustrates a coding stage A and FIG. 3(b) illustrates a decoding stage B. In this embodiment, a function operation component 1b for performing operation using coding function f is added to the converter component 1 of the coder a and decoder b.

The system shown in FIGS. 3(a) and 3(b) can be represented by the following numerical formulas

| Coding Stage A Side: | |
| --- | --- |
| 1st block (i = 1) | $C_i = L_M (P_i, f_k(IV))$ |
| 2nd and subsequent blocks (i = 2,...) | $C_i = L_M (P_i, f_k(C_{i-1}))$ |
| Decoding Stage B Side: | |
| 1st block (i = 1) | $P_i = L_M^{-1} (C_i, f_k(IV))$ |
| 2nd and subsequent blocks (i = 2,...) | $P_i = L_M^{-1} (C_i, f_k(C_{i-1}))$ | where k is the key number of coding function f.

Figure 4A:
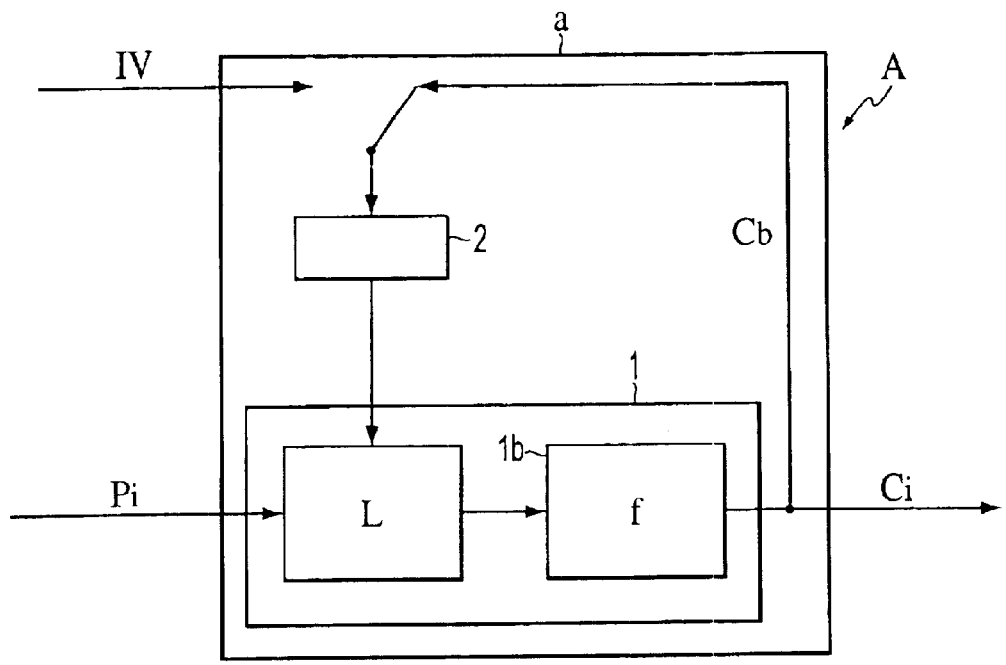
FIGS. 4(a) and 4(b) show constitution of an embodiment of the invention to which a coding function for ciphering and decoding function for decoding are added.
Figure 4B:
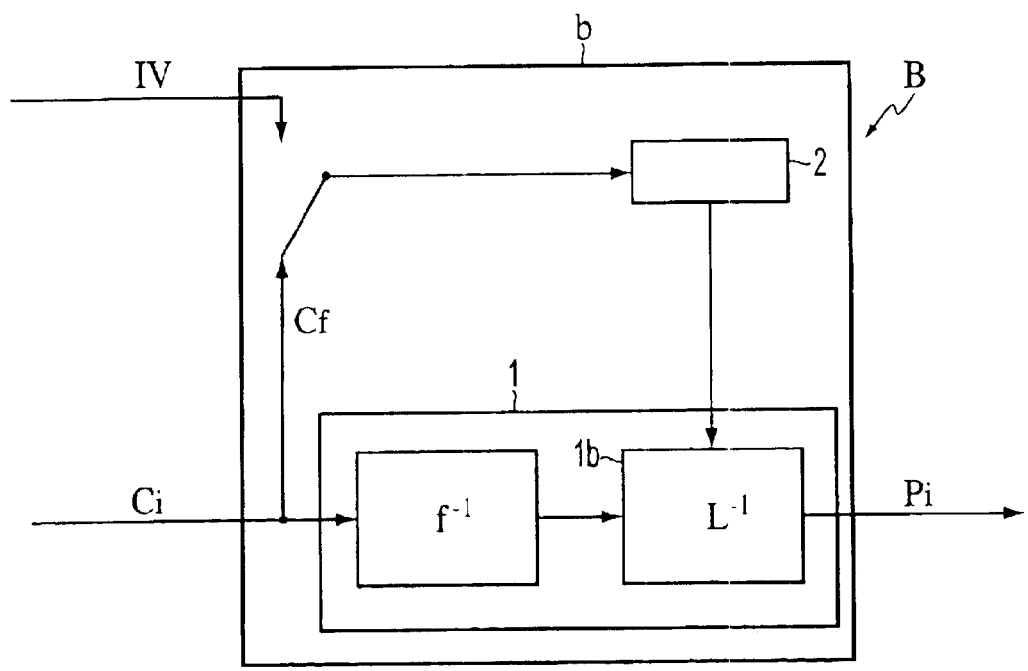

FIGS. 4(a) and 4(b) show an embodiment, wherein a converter component 1 of coder a is provided with coding function f for coding the output of coding Latin square L, and a converter component 1 of the decoder b is provided with the decoding function $f^{-1}$ for decoding the input coded signal $C_i$ by performing inverse conversion using the coding function f, and inputting the decoded signal to the decoding Latin square $L^{-1}$. FIG. 4(a) illustrates coding stage A, and FIG. 4(b) decoding stage B.

For coding a 1st data block using the system shown in FIGS. 4(a) and 4(b), the row and column positions of the coding Latin square L are specified respectively using the plain-text signal $P_i$ and the initial value signal. The value of the specified element is further coded using coding function f to obtain coded signal $C_1$. For coding the 2nd and subsequent data blocks, the element position is specified by row and column of coding Latin square L respectively using plain-text signal $P_i$ and feedback signal $C_b$, which is the preceding coded signal $C_i$. The values of the specified elements are further coded using the coding function f to obtain coded signal $C_i$.

In decoder b, the 1st data block is decoded by decoding the coded signal $C_i$ using the decoding function $f^{-1}$. The element position is specified by the row and column of decoding Latin square $L^{-1}$ by the decoded value and the initial value signal IV having the same value as the value used for coding. This provides the decoded plain-text signal $P_i$ by decoding the value of the specified element. To decode the 2nd and subsequent blocks, coded signal $C_i$ is decoded by means of the decoding function $f^{-1}$. Further, the position of each element is specified by row and column of the decoding Latin square $L^{-1}$ using the decoded value and the feedforward signal $C_f$, which is a preceding coded signal $C_i$. The value of the specified element is decoded to obtain the plain-text signal $P_1$.

The above method can be expressed by the following expressions:

| Coding Stage A Side: | |
| --- | --- |
| 1st block | $C_i = f_k (L_M (P_i, IV))$ |
| 2nd and subsequent blocks | $C_i = f_k (L_M (P_i, C_{i-1}))$ |
| Decoding Stage B Side: | |
| 1st block | $P_i = L_M^{-1} (f_k^{-1} (C_i), IV)$ |
| 2nd and subsequent blocks | $P_i = L_M^{-1} (f_k^{-1} (C_i), C_{i-1})$ |

Figure 5A:
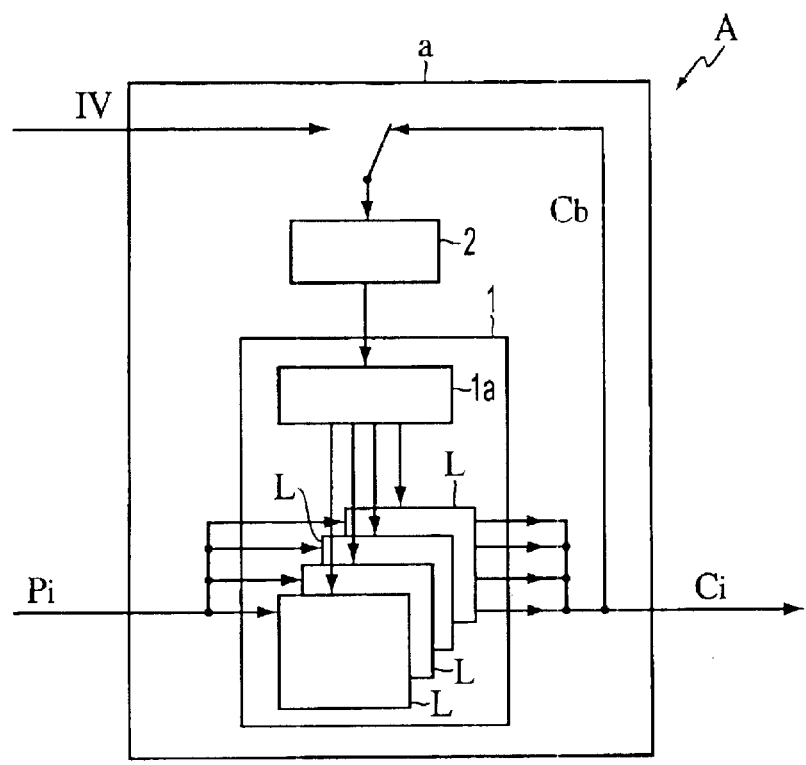
FIGS. 5(a) and 5(b) show constitution of an embodiment of the invention in which a plurality of Latin squares are used for ciphering.
Figure 5B:
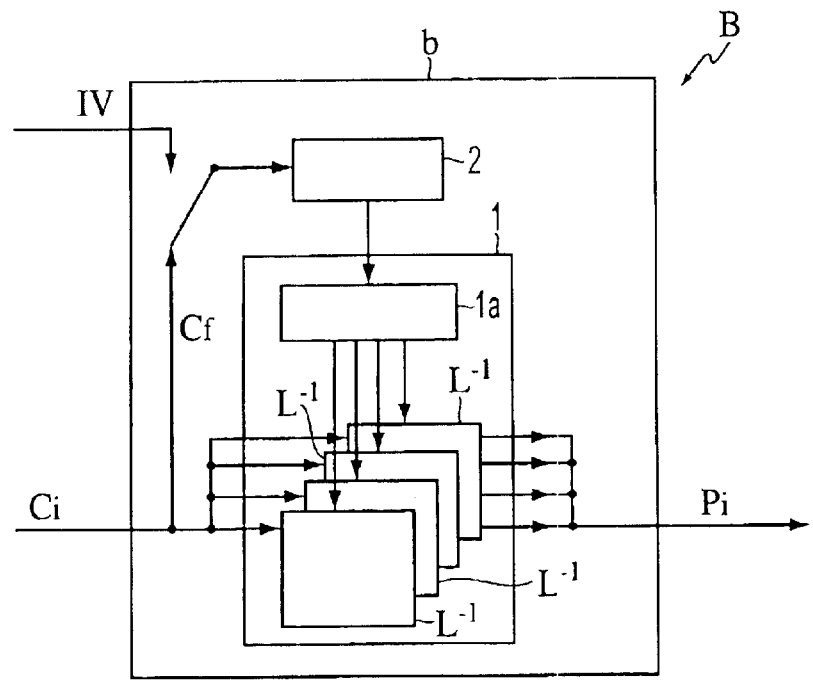

FIGS. 5(a) and 5(b) show an embodiment, wherein one converter component 1 comprises a plurality of coding Latin squares L and a plurality of decoding Latin squares $L^{-1}$ connected in parallel. In this embodiment, a plurality of Latin squares are selectively used by being switched according to a predetermined sequence synchronized with the input of the plain-text signal $P_i$ or the coded signal $C_i$. The converter component 1 is provided with a plurality of Latin squares and Latin square specifier 1a. FIG. 5(a) illustrates the coding stage A, while FIG. 5(b) illustrates the decoding stage B. The plurality of coding Latin squares L and a plurality of decoding Latin squares $L^{-1}$, which individually correspond to one another, are selectively used by means of the output of a temporary storage 2, the output being distributed by the Latin square specifier 1a. Therefore, not only are a great number of coding keys available but also neighboring coded signals $C_1$ can be made irrelevant to one another. This makes it difficult to identify Latin squares adding to the difficulty of decoding and improving security of secrecy.

Figure 6A:
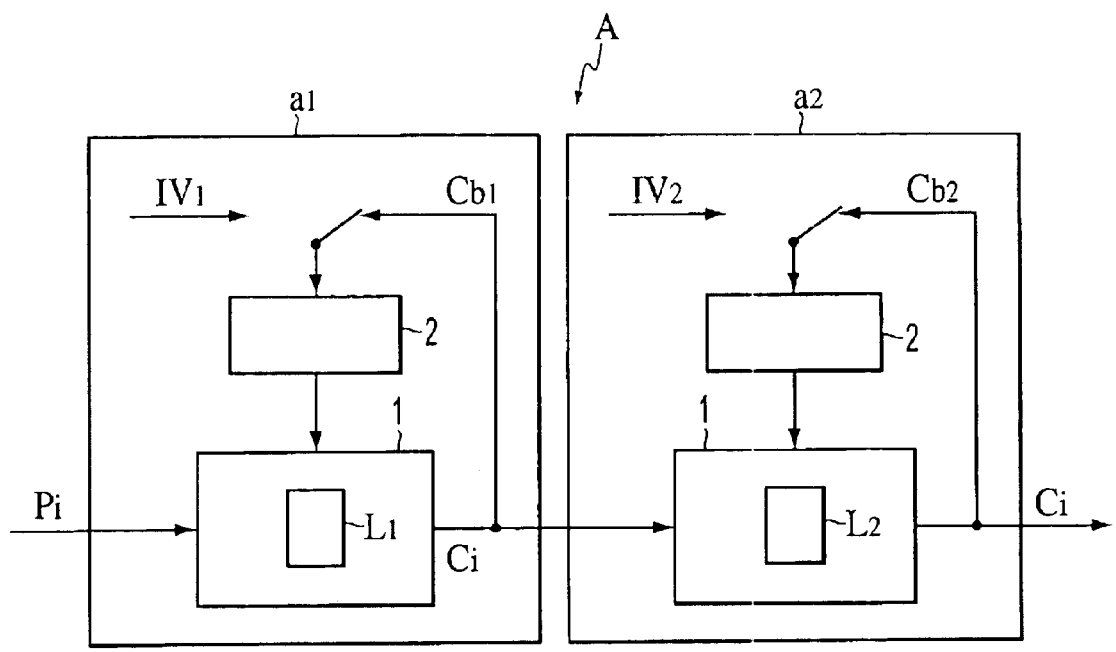
FIGS. 6(a) and 6(b) show constitution of an embodiment wherein two components having conversion function are connected in series for ciphering.
Figure 6B:
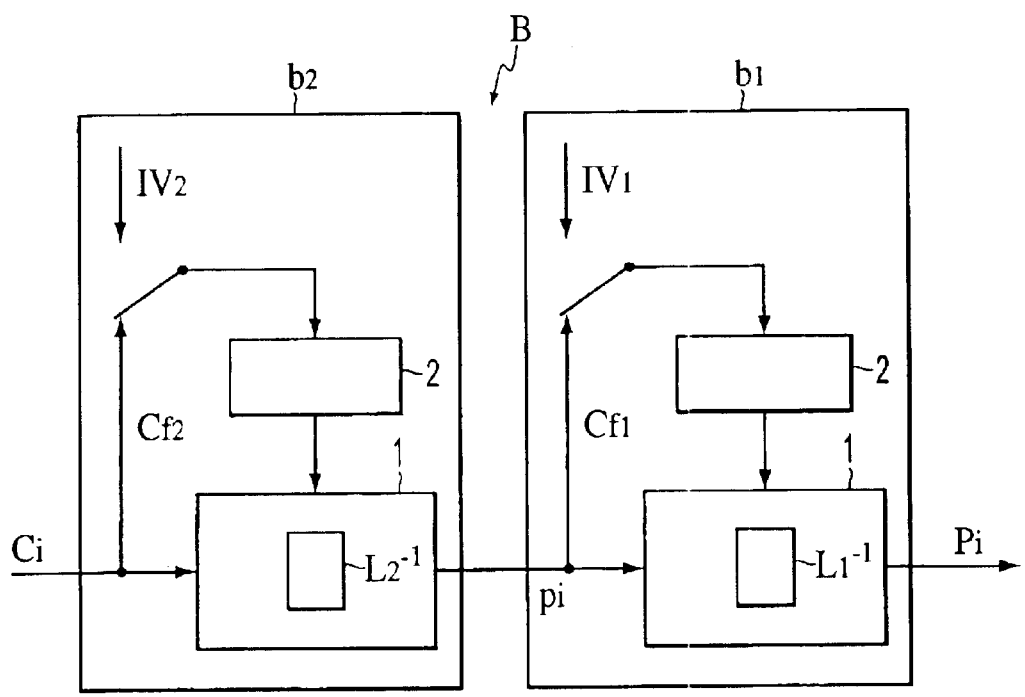

FIGS. 6(a) and 6(b) show an embodiment, wherein coding stage A and decoding stage B are composed respectively of serially connecting 2 sets of coders a and 2 sets of decoders b according to the embodiment shown in FIGS. 1(a) and 1(b). FIG. 6(a) illustrates the coding stage A, while FIG. 6(b) illustrates the decoding stage B. In the coding stage A, a semi-coded signal $C_{i-1}$, decoded by a first decoder a, is further decoded into a coded signal $C_i$ by a second coder $a_2$. In the coding stage B, a semi-plain-text signal obtained by decoding the input coded signal $C_i$ by a second decoder $b_2$ is further decoded by a first decoder $b_1$ to obtain a plain-text signal $P_1$, whereby the coded signal $C_i$ becomes double-coded text.

In the embodiment of FIGS. 6(a) and 6(b), the coding stage A has two coders a connected in series, and the decoding stage B has two decoders b connected in series. However, these stages may have more than two coders connected in series and more than two decoders connected in series respectively. Nevertheless, each of the coding stage A and the decoding stage B must be capable of making the initial value signal IV available. That is, the first coder a, and corresponding first decoder $b_1$ require input of the initial value signal $IV_1$, while the second coder $a_2$ and corresponding second decoder $b_2$ require input of the initial value signal $IV_2$.

Figure 7A:
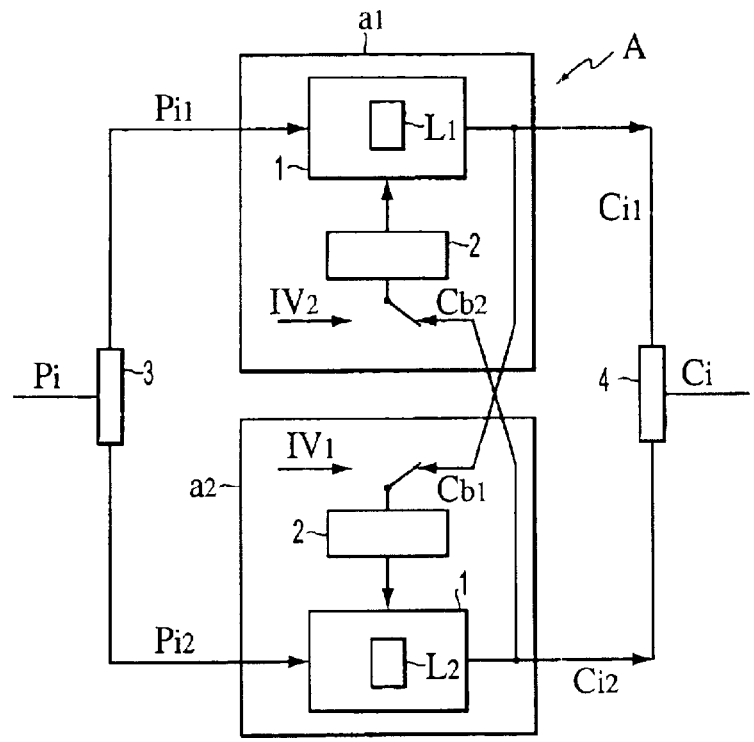
FIGS. 7(a) and 7(b) show constitution of an embodiment of the invention in which two components having conversion function are connected in parallel.
Figure 7B:
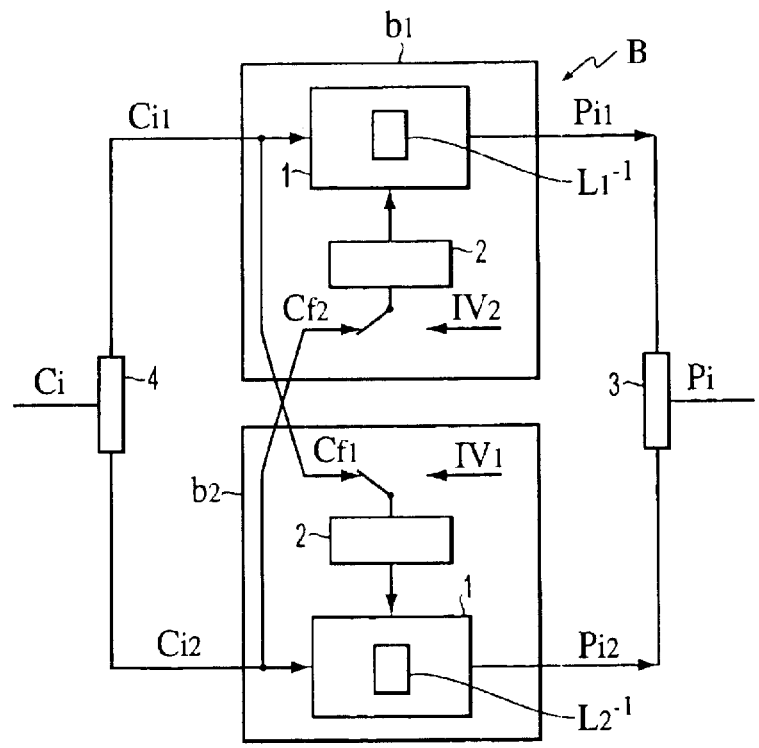

FIGS. 7(a) and 7(b) show an embodiment, wherein the coding stage A has two coders, according to the embodiment of FIG. 1(a), connected in parallel, and the decoding stage B has two decoders, according to the embodiment of FIG. 1(b), connected in parallel. In this embodiment, two, sequentially-input plain-text signals $P_i$ are substantially simultaneously distributed to the two coders to be converted into the coded signals $C_i$. Two decoded signals are arranged according to a predetermined sequence and substantially-simultaneously output from two decoders b as plain-text signals $P_1$. FIG. 7(a) illustrates the coding stage A and FIG. 7(b) illustrates the decoding stage B.

According to the embodiment shown in FIG. 7, in the coding stage A, two plain-text signals $P_i$ received in sequence are stored in a plain-text permutation specifier 3, and, according to a predetermined sequence of arrangement, one plain-text signal $P_{i1}$ is distributed to the first coder $a_1$, while the other plain-text signal $P_{i2}$ is distributed to the second decoder $a_2$. The coded signal $C_{i1}$ coded by the first coder $a_1$, and the coded signal $C_{i2}$ coded by the second coder $a_2$, are stored in a code permutation specifier 4 and arranged according to a predetermined sequence to be output as coded signal $C_i$. In the coding stage B, two coded signals $C_i$ input in sequence, are temporarily stored in a code permutation specifier 4. Then, according to a sequence that is the reverse of that of the code permutation specifier 4 of the coding stage A, the coded signal $C_{i1}$ is distributed to the first decoder $b_1$, and the coded signal $C_{i2}$ is distributed to the second decoder $b_2$. Plain-text signal $P_{i1}$, decoded by the first decoder $b_1$, and plain-text signal $P_{i2}$, decoded by the second decoder $b_2$ are stored in a plain-text permutation specifier 3, and are arranged in a sequence that is the reverse of that of the plain-text permutation specifier 3 of the coding stage A to be output as decoded plain-text signal $P_1$.

Therefore, in addition to the effect produced by the embodiment of FIGS. 5(a) and 5(b), outputting the coded signals $C_1$ sequentially, actually outputs the signals in a sequence that is made non-coincident with the sequence of the codes representing the actual content of the plain-text. Therefore, the original sequential relationship among the coded signals can be made impossible to analyze.

Figure 8A:
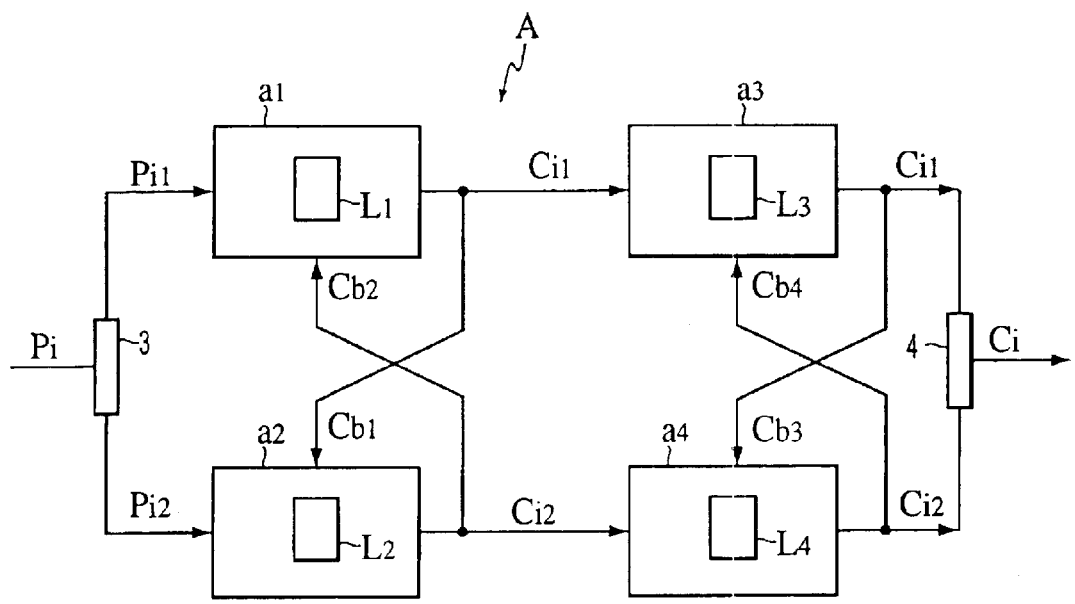
FIGS. 8(a) and 8(b) show constitution of an embodiment of the invention, wherein four components having conversion function are connected in series and in parallel for ciphering.
Figure 8B:
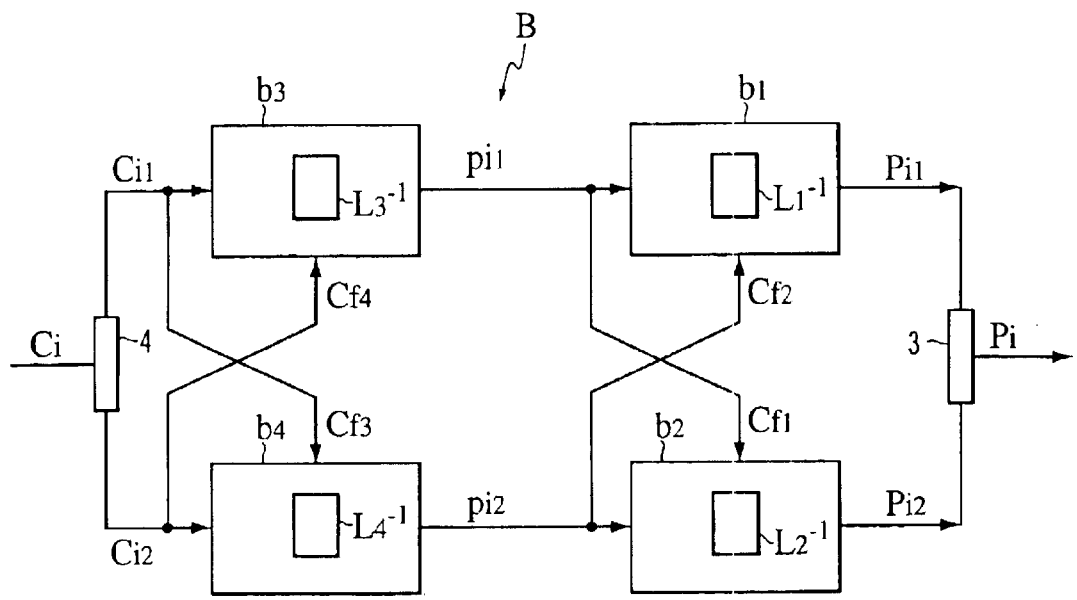

The embodiment shown in FIGS. 8(a) and 8(b) is a combination of the embodiment illustrated in FIGS. 6(a) and 6(b) and the embodiment of FIGS. 7(a) and 7(b). In this embodiment, a coding stage A and decoding stage B are respectively composed of one circuit, having a serially connected first coder a and first decoder b, and another circuit, having serially connected second coder a and second decoder b. These two circuits are connected in parallel. Similarly to the embodiment shown in FIGS. 7(a) and 7(b), the coding stage A and decoding stage B are respectively provided with a plain-text permutation specifier 3 and a code permutation specifier 4. FIG. 8(a) illustrates a coding stage A and FIG. 8(b) illustrates a decoding stage B.

Figure 9A:
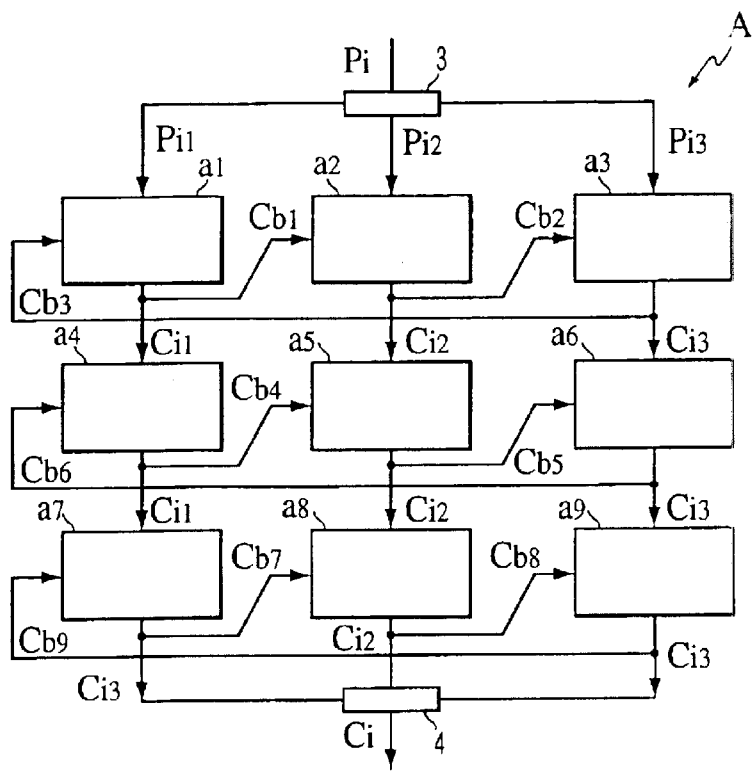
FIGS. 9(a) and 9(b) show constitution of an embodiment of the invention, wherein a plurality of components having conversion function are connected in series and in parallel for ciphering.
Figure 9B:
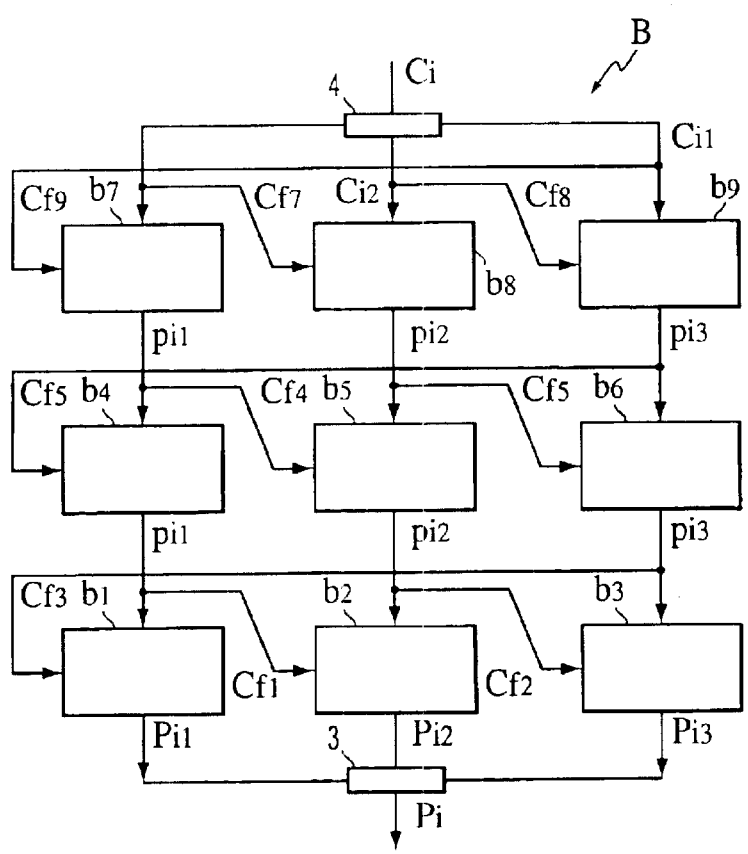
Figure 10A:
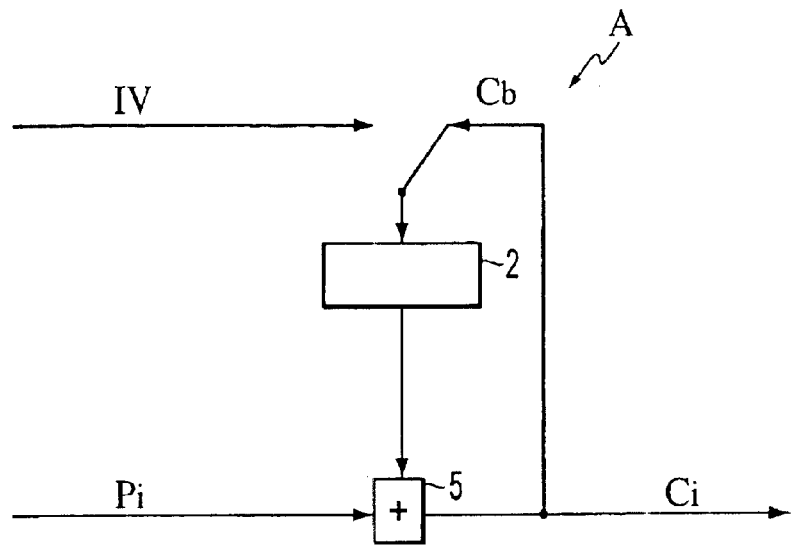
FIGS. 10(a) and 10(b) show the constitution of cited prior art.
Figure 10B:
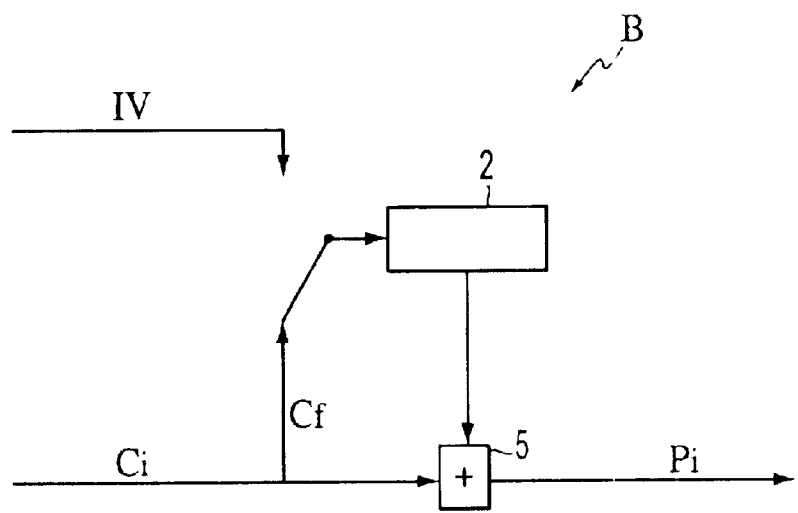

FIGS. 9(a) and 9(b) and shows an embodiment wherein each of a coding stage A and a decoding stage B comprises more than two coders a and more than two decoders (the figures include three in this embodiment), which are connected in series and in parallel. FIG. 9(a) illustrates the coding stage A, and FIG. 9(b) illustrates the decoding stage B.

According to the embodiment of FIGS. 8(a) and 8(b) and that of FIGS. 9(a) and 9(b), the illustrations of the internal structures of coders a and decoders b are omitted. However, the structures may be, for example, those illustrated in FIGS. 1(a) and 1(b), as well as those given in FIGS. 3(a) and 3(b), 4(a) and 4(b), 5(a) and 5(b), 6(a) and 6(b) and 7(a) and 7(b).

According to the embodiment shown in FIGS. 7(a) and 7(b), FIGS. 8(a) and 8(b) and FIGS. 9(a) and 9(b), a preceding signal $_{i-1}$ to a given output signal may be used as feedback signal $C_b$ in each coder a. Also, a preceding signal to a given input signal $C_{i-1}$ may be used as a feedback signal $C_f$ in each decoder b. However, in the embodiments illustrated in relevant figures, a preceding coded signal block $C_{i-1}$ that precedes a signal incoming from another coder a and a preceding coded signal block $C_{i-1}$ that precedes a signal outgoing to another decoder b may also be used. In this case, the apparent block length of the ciphered text to be output becomes equivalent to the multiple of the number of the coders. This further adds to the difficulty of analysis of the key to the coded text.

When a coding stage A comprises a plurality of coders a and a decoding stage B comprises a plurality of decoders b, it is necessary to set an initial value signal IV for each coder a and each decoder b. The initial value signal can be set most easily by inputting a previously set initial value signal IV to each coder a through the input line for the feedback signal $C_b$ and by inputting the same previously set initial value signal IV to each decoder through the input line for feed-forward signal $C_f$. However, it is also possible to do the same by inputting the plain-text signal $C_i$ to be initially input to each coder a and each decoder b. With this method not only the composition of hardware but also alteration of the setting of the initial value signal can be made simpler and freer.

Designed as described in the foregoing, the invention brings about the effect described in the following. The Latin square is used for the converter that performs the operation for coding and decoding according to the block coding method. Consequently, the values made available by operation are a plurality of natural numbers, which are not limited to simple values such as "1" and "0", thereby adding to secrecy security for coded text.

The result of operation of the converter that performs the operations for coding/decoding can be varied freely and readily by selecting and altering the Latin squares, which can be made available in a large variety, thereby adding to the secrecy-security ability of the coding method.

Using the Latin squares enables coding of plural bits and results in nonlinear coding, increases the number of bits as a unit of conversion and increases in complexity of data, thereby making the analysis of the data extremely difficult.

According to the invention, the Latin squares are used for the converters, and the coding and decoding are made respectively by determining one of the values of the row, the value of the column and the value of the element of a given Latin square by determining any two of these values, whereby the conversion by coder and decoder can be made with higher accuracy and simpler, thereby enabling rapid and accurate processing of information.

A converter may be provided with a plurality of Latin squares, so that the Latin squares can be used selectively in sequence, thereby easily assuring a high secrecy security of coded text.

A plurality of coders and a plurality of decoders can be connected in series and/or in parallel respectively, and the feedback signal and feedforward signal can be obtained from another coder and decoder, thereby enabling further adding to secrecy security of coded signal.

What is claimed is:

1. A coding method for an information secrecy security system designed for transmitting and storing the contents of plain-texts converted into a form of digital information while securing secrecy of the contents thereof, the method comprising:

coding a plain-text signal $P_i$ of a predetermined number of bits into a unit block of a coded signal using a feedback coding method, the feedback coding method comprising:

using a coding Latin square L as a conversion table for a converter component of a coder in said coding method;

using a plain-text signal $P_i$ and an initial value signal in a first conversion;

using the plain-text signal $P_i$ and a coded signal $C_i$, which is converted from a preceding plain-text signal $P_{i-1}$, in a second and subsequent conversions as a feedback signal $C_b$ to specify row and column positions of said coding Latin square L; and using a value corresponding to the specified positions as a coded signal $C_i$; and decoding using the coded signal $C_i$ as a unit block using feedforward decoding method, the decoding method comprising:

using a decoding Latin square $L^{-1}$, corresponding to said coding Latin square L, as a conversion table for a converter component in a decoder according to said feedforward decoding method;

using coded signal $C_i$ and an initial value signal, which is the same as that used for coding, in the first conversion; and using said coded signal $C_i$ and a preceding coded signal $C_{i-1}$ as a feedforward signal $C_f$ in the second and subsequent conversions to convert the value obtained from said decoding Latin square $L^{-1}$ into a decoded plain-text signal $P_i$, wherein the converter decoding Latin square $L^{-1}$ into a decoded plain-text signal $P_i$, wherein the converter component comprises a plurality of coding Latin squares and a plurality of decoding Latin squares, and wherein, said plurality of Latin squares are selectively used by being switched according to a predetermined sequence synchronized with input of the plain-text signal $P_i$ or the coded signal $C_i$.

2. A coding method according to claim 1, wherein the converter component of the decoder comprises a decoding Latin square $L^{-1}$ for conversion that is inverse to the conversion performed by the coding Latin square L, wherein, the value of said decoding Latin square $L^{-1}$ determined by the value of the row or column represented by the coded signal $C_i$ and the initial value signal or the value of the row or column represented by the feedforward signal $C_f$, which is equivalent to a preceding coded signal $C_{i-1}$, makes a decoded plain-text signal $P_i$.

3. A coding method according to claim 1, wherein the converter component of the decoder comprises decoding Latin square $L^{-1}$ for conversion that is inverse to the conversion performed by the coding Latin square L, wherein, the value of the row or column obtained from the value of the decoding Latin square $L^{-1}$ represented by the coded signal $C_i$ and the value of the row or column represented by the initial value signal or feedforward signal ($C_f$), which is a preceding coded signal ($C_{i-1}$), is used as a decoded plain-text signal $P_i$.

4. A coding method according to claim 1, wherein an initial value signal and a preceding coded signal $C_{i-1}$ input to the converter component and the coder are coded by coding function, which is a predetermined coding algorithm, and input to the coding Latin square L and the decoding Latin square $L^{-1}$.

5. A coding method according to claim 1, wherein, in the converter component of the coder, an output of the coding Latin square L is coded by the coding function f, which is a predetermined coding algorithm; and in the converter component of the decoder, said input coded signal $C_i$ is decoded using said coding function f and a decoding function $f^{-1}$ for inverse conversion and input to the decoding Latin square $L^{-1}$.

6. A coding method according to claim 1, wherein a plurality of coders and a plurality of decoders are connected in series.

7. A coding method according to claim 1, wherein a plurality of coders and a plurality of decoders are connected in parallel;

a plurality of plain-text signals $P_i$ are distributed by a predetermined arrangement and input substantially simultaneously to said individual coders; and individual plain-text signals $P_i$ substantially simultaneously output from said decoders are then arranged according to said predetermined sequence and output.

8. A coding method according to claim 7, wherein a preceding coded signal $C_{i-1}$ that precedes a signal output from the coder is used as a feedback signal $C_b$; and a preceding coded signal $C_{i-1}$ that precedes a coded signal input to the decoder is used as feedforward signal $C_f$.

9. A coding method according to claim 7, wherein a preceding coded signal $C_{i-1}$ that precedes a signal input to a first coder from another coder is used as a feedback signal $C_b$; and a preceding coded signal $C_{i-1}$ that precedes a coded signal output from a first decoder to another decoder is used as feedforward signal $C_f$.

10. A coding method according to claim 1, wherein a plurality of series circuits comprising a plurality of coders and a plurality of series circuits comprising a plurality of decoders are connected in parallel respectively;

a plurality of input plain-text signals $P_i$ are substantially simultaneously distributed among the plurality of series circuits of said coder according to a predetermined sequence arrangement; and a plurality of plain-text signals $P_i$ substantially simultaneously output from the plurality of series circuits of said decoders are output according to an arrangement in the predetermined sequence arrangement.

11. A coding method according to claim 10, wherein a preceding coded signal $C_{i-1}$ that precedes a coded signal output from each of the coders connected in series, is used as a feedback signal $C_b$; and a preceding coded signal $C_{i-1}$ that precedes a coded signal input to each of decoders connected in series, is used as a feedforward signal $C_f$.

12. A coding method according to claim 10, wherein, in each of the coders connected in series, a preceding coded signal $C_{i-1}$ that precedes a coded signal input from another corresponding coder of another series circuit of other said coders is used as feedback signal $C_b$; and in each of said decoders connected in series, a preceding coded signal $C_{i-1}$ that precedes a coded signal input from another corresponding decoder of another series circuit composed of other decoders is used as feedforward signal $C_f$.

13. A coding method according to claim 1, wherein the input of initial value signal to a converter component is made through an input line of a feedback signal $C_b$, as a previously provided input line of initial value signal, or through an input line of the feedforward signal $C_f$.

14. A coding method according to claim 1, wherein the input of initial value signal to a converter component is made accompanying input of the initial plain-text signal $P_i$ or initial coded signal $C_i$.

* * * * *

UNITED STATES PATENT AND TRADEMARK OFFICE
CERTIFICATE OF CORRECTION

PATENT NO. : 6,731,754 B1
DATED : May 4, 2004
INVENTOR(S) : Toru Ito

It is certified that error appears in the above-identified patent and that said Letters Patent is hereby corrected as shown below:

Column 13,
Lines 19-21, delete "wherein the converter decoding Latin square $L^{-1}$ into a decoded plain-text signal $P_i$,".

Signed and Sealed this

Twentieth Day of July, 2004

JON W. DUDAS
*Acting Director of the United States Patent and Trademark Office*